United States Patent
Chen et al.

(10) Patent No.: US 9,678,799 B2
(45) Date of Patent: Jun. 13, 2017

(54) DYNAMIC CORRELATED OPERATION MANAGEMENT FOR A DISTRIBUTED COMPUTING SYSTEM

(71) Applicant: INTERNATIONAL BUSINESS MACHINES CORPORATION, Armonk, NY (US)

(72) Inventors: Ye Na Chen, Shanghai (CN); Ya-Huey Juan, San Jose, CA (US); Ronald D. Martens, Benson, AZ (US); Jing Peng, Shanghai (CN); Yibo Xu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 70 days.

(21) Appl. No.: 14/621,312

(22) Filed: Feb. 12, 2015

(65) Prior Publication Data

US 2016/0239341 A1    Aug. 18, 2016

(51) Int. Cl.
| | |
|---|---|
| *G06F 9/54* | (2006.01) |
| *G06F 9/50* | (2006.01) |
| *G06F 9/48* | (2006.01) |
| *G06F 9/445* | (2006.01) |

(52) U.S. Cl.
CPC ........ *G06F 9/5011* (2013.01); *G06F 9/44505* (2013.01); *G06F 9/4881* (2013.01)

(58) Field of Classification Search
CPC ... G06F 9/5011; G06F 9/4881; G06F 9/44505
See application file for complete search history.

(56) References Cited

U.S. PATENT DOCUMENTS

| | | | |
|---|---|---|---|
| 7,117,229 B2 | 10/2006 | Marshall et al. | |
| 8,423,621 B2 | 4/2013 | Warren et al. | |
| 8,484,163 B1 * | 7/2013 | Yucel | G06F 17/30289 370/216 |
| 2009/0077262 A1 | 3/2009 | Roberts | |
| 2010/0036894 A1 | 2/2010 | Senda et al. | |
| 2013/0198134 A1 | 8/2013 | Akulavenkatavara et al. | |

* cited by examiner

*Primary Examiner* — Syed Roni
(74) *Attorney, Agent, or Firm* — William K. Konrad; Konrad Raynes Davda & Victor LLP (57) ABSTRACT

In one aspect of the present description, in a distributed node management system for a distributed computing system having multiple processor nodes, each processor node has a local data structure which contains a "to-do tasks" synchronization table that resides on each such processor node. The "to-do-tasks" synchronization table contains one or more actions that each processor node may perform to facilitate maintaining the operations of the associated processor node with equivalent knowledge of the system configuration, status and backup capabilities as the other processor nodes of the distributed computing system. Other features and aspects may be realized, depending upon the particular application.

20 Claims, 6 Drawing Sheets

FIG. 10

DYNAMIC CORRELATED OPERATION MANAGEMENT FOR A DISTRIBUTED COMPUTING SYSTEM

TECHNICAL FIELD

This description relates in general to distributed computing systems, and more particularly, to a method, system and program product for facilitating dynamic correlated operation management for a distributed computing system, such as, for example, management of reconfiguration of a distributed computing system.

BACKGROUND

In order to provide for high-throughput of work, or nearly continuous availability, distributed computing systems are often utilized. A distributed computing system typically includes two or more computing devices which frequently operate somewhat autonomously and communicate with each other over a network or other communication path. A computing device of a distributed system that has the capability of sharing resources is often referred to as a cluster which has two or more processor nodes, each node having a processor or at least a processor resource, and typically, a separate operating system.

Certain tasks are frequently correlated amongst the processor nodes of the distributed computing system. For example, a distributed computing system may be reconfigured from time to time as computing needs change, or devices or software is added, upgraded or replaced. Such reconfiguration is often controlled at a processor node of the distributed computing system. As a particular processor node reconfigures the distributed computing system, the other processor nodes of the distributed computing system are kept informed via communication links over which the various processor nodes communicate with each other.

The processor node performing the reconfiguration as well as each processor node upon being informed of a system reconfiguration, typically automatically performs various housekeeping tasks in response to the reconfiguration including clean-up and database update tasks to reflect the changes in the system. Thus, a reconfiguration operation is an example of a multi-node correlated operation in which various tasks related to the operation are correlated amongst the processor nodes of the distributed computing system. However, due to communication link failures or a processor node going offline, the reconfiguration may occur while one or more processor nodes are offline or otherwise out of communication with the processor node conducting the reconfiguration. As a result, the missing processor nodes may not have performed the housekeeping tasks associated with the reconfiguration. In such cases, when the missing processor node comes back online or communication is otherwise reestablished, the system operator typically manually controls the returning processor node to perform the housekeeping tasks associated with the reconfiguration that occurred while the returning processor node was inactive or out of communication with the other nodes of the system.

SUMMARY

In one aspect of the present description, operations are described comprising a maintaining by a first processor node of a plurality of processor nodes in a distributed computing system, a first synchronization data structure having an entry for each processor node in the distributed computing system. In one embodiment, each entry for an associated processor node is configured to identify a multi-node correlated operation related task to be performed by the associated processor node in association with a multi-node correlated operation of the distributed computing system in the event of a communication failure with the associated processor node in the distributed computing system.

In one embodiment, the first processor node performs a first multi-node correlated operation such as a first reconfiguration of the distributed computing system, performs a first reconfiguration related task in association with the first reconfiguration of the distributed computing system, and detects a failure to communicate with a second processor node of the distributed computing system. In response, the first processor node updates the entry associated with the second processor node in the first synchronization data structure to indicate a first reconfiguration task to be performed by the second processor node.

Other features and aspects may be realized, depending upon the particular application. For example, in other embodiments, an entry of a synchronization data structure in accordance with the present description may relate to tasks related to multi-node correlated operations other than reconfiguration, for example.

DETAILED DESCRIPTION

Figure 1:
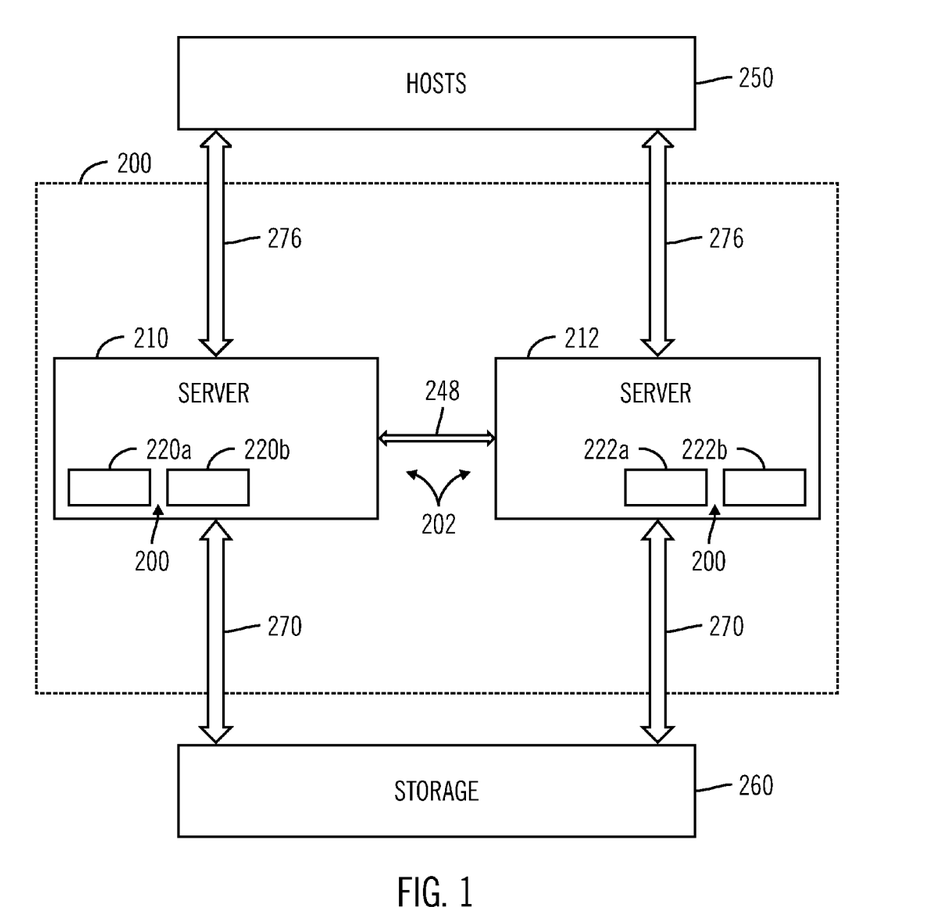
FIG. 1 illustrates an example of a computing environment having a distributed computing system employing a distributed node management system such as a dynamic correlated operation management system, in accordance with one aspect of the present description.

One example of a distributed computing system incorporating and using aspects of distributed node management such as dynamic correlated operation management, in accordance with one embodiment of the present description, is depicted at 200 in FIG. 1 and described herein. A distributed computing system in accordance with the present description may include a plurality of processor nodes, which may be provided by various computing devices including clusters, servers, virtual servers, controllers and other programmed or dedicated processors. A primary function of the distributed computing system of this embodiment is to provide a data processing function such as data backup, data retrieval, data deduplication, data mining, data capture, data archiving, data replication, bandwidth reduced data replication, encryption of data etc. It is appreciated that a distributed computing system in accordance with the present description may perform other data processing functions, depending upon the particular application.

In one aspect of the present description, each processor node of the distributed computing system has a local data structure which contains a "to-do tasks" synchronization table that resides locally on each such processor node. The "to-do-tasks" synchronization table contains one or more actions that processor nodes of the system may perform to facilitate maintaining the operations of each processor node with equivalent knowledge of the system configuration, status and backup capabilities as the other processor nodes of the distributed computing system. Although system reconfiguration is described as one application of dynamic correlated operation management for a distributed computing system in accordance with the present description, it is appreciated that dynamic correlated operation management for a distributed computing system in accordance with the present description may be applied to other types of distributed computing system correlated operations and tasks for distributed node management.

In enterprise level server and storage systems which typically operate twenty four hours a day, seven days a week, the cluster nodes are frequently managed by multiple central control processor nodes. To enhance flexibility of the system, it is useful for each central control processor node to have equivalent knowledge of the system configuration, status and backup capabilities as all of the other processor nodes. Accordingly, should one processor node die or fail, another processor node or nodes can immediately take over the control responsibility and continue to manage the systems. Thus, with each processor node operating with equivalent system knowledge as the other nodes, the system operator would have the option of selecting any processor node to manage the system, including reconfiguring the system as need be.

In one aspect of the present description, propagation of such equivalent knowledge is facilitated by the "to-do-tasks" synchronization tables notwithstanding that one or more processor nodes may be offline from time to time. Accordingly, as long as one processor nodes is online, the system may continue to run and may be reconfigured as appropriate notwithstanding that other processor nodes of the system may be offline.

As used herein, the term "tasks" includes operations and actions which are performed by a processor node. Accordingly, a variety of server operations and actions may be included in a "to-do tasks" synchronization table in accordance with the present description.

For example, associated with a reconfiguration of hardware or software (or both) in a distributed computing system, there are frequently various housekeeping operations such as cleanup and database updates actions which are correlated to and thus are performed as a result of the reconfiguration process. One such housekeeping task is to update a local database which tracks which nodes are active, tracks the status of other hardware such as switches and storage and tracks software versions actively operating in the distributed computing system. Upon a reconfiguration of the system, each local processor node typically updates its local database to reflect the reconfigured state of the system.

Accordingly, the particular processor node which is performing the actual reconfiguration of software or hardware, will typically automatically perform any associated local housekeeping tasks associated with the reconfiguration. Moreover, the other processor nodes in communication with the processor node performing the reconfiguration, are informed of the reconfiguration and as such, will typically perform their own local housekeeping tasks associated with the reconfiguration. In this manner, a reconfiguration performed by a processor node of a multi-node system, is an example of a multi-node correlated operation. Each processor node performs tasks correlated to the correlated operation which in this example, is a reconfiguration operation which reconfigures the distributed computing system.

However, processor nodes which are inactive at the time of the reconfiguration or are otherwise out of communication with the processor node performing the reconfiguration may in prior systems remain uninformed of the reconfiguration, and thus may not have performed local housekeeping tasks associated with the reconfiguration. Accordingly, when the inactive processor nodes become active or communication links are repaired restoring communication with missing processor nodes, those previously inactive or missing processor nodes may not operate in full synchronization with the other processor nodes since appropriate local housekeeping tasks may not have been performed.

In accordance with one aspect of the present description, the processor node which is conducting the reconfiguration operation (referred to herein frequently as the "source" processor node) can populate a local to-do tasks synchronization table residing on the source processor node, identifying tasks to be done by inactive or missing processor nodes (hereinafter frequently referred to as the "target" processor nodes). The identified tasks may be associated with the reconfiguration operation performed by the source processor node. When a target processor node becomes active again or communication to that target processor node is restored, the source and target processor nodes can synchronize their respective local to-do task synchronization tables such that entries of the source processor node local to-do synchronization table pertaining to the target processor node may be used to populate the corresponding entries of the target processor node local to-do synchronization table. In this manner, each target processor node is made aware of the housekeeping task or tasks which it should perform in connection with the reconfiguration operation which occurred while the target processor node was inactive or otherwise missing. Accordingly, the previously inactive and now active processor nodes and the previously missing and now found processor nodes, may perform the appropriate housekeeping tasks associated with the reconfiguration performed in their absence. As a result, the operations of the target processor nodes of the distributed computing system may operate again with equivalent knowledge of system status, configuration and backup capabilities as the other processor nodes of the distributed computing system. Although an embodiment of the present description is described in connection with a reconfiguration operation, it is appreciated that distributed node management such as dynamic task correlated operation management, in accordance with the present description, may be applied in other embodiments to multi-node correlated operations other than reconfiguration of a distributed computing system.

Figure 2:
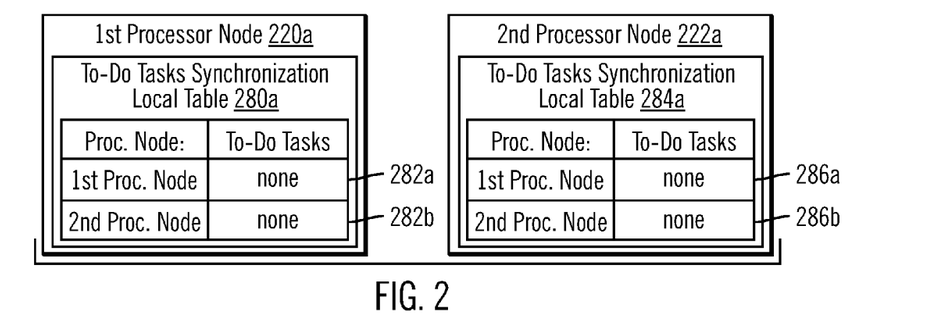
FIGS. 2-7 illustrate various examples of two local data structures for two processor nodes, respectively, each data structure containing a "to-do tasks" synchronization table that resides locally on the associated processor node of the distributed computing system of FIG. 1.

In the example of FIG. 2, the distributed computing system 200 includes a cluster 202 having two servers, a server 210 and a server 212, each of which may include one or more processor nodes 220a, 220b, 222a, 222b which share resources and collaborate with each other in performing system tasks. Although one cluster 202, two servers 210, 212 and four processor nodes 220 are depicted in the illustrated embodiment, it is appreciated that the distributed computing system 200 may have a fewer or a greater number of clusters, servers and processor nodes, depending upon the particular application.

Each server 210, 212 may have one or more central processing units (CPUs) in which the processing, memory and other resources of the server may be apportioned into logical partitions, often referred to as a "virtual server," each of which is capable of running an individual copy of an operating system and performing the service functions of a "server". Thus, as used herein, the term "server" may be used to refer to a physical server or a logical partition or virtual server performing a server function.

Each processor node 220a, 220b, 222a, 222b typically includes a virtual or physical server having processor and memory resources running an individual copy of an operating system. Hence, each processor node 220 is capable of independently performing data processing functions as well as distributed node management functions assigned to that processor node.

It is appreciated that any processor node could go offline while one or more of the surviving processor nodes is in the process of reconfiguring the system. In prior systems, a server that just recently came online may be not have the latest system configuration and thus may be attempt to manage the system with system knowledge which is not equivalent to that of the remaining online processor nodes.

As set forth above, distributed node management in accordance with one aspect of the present description facilitates an offline processor node synchronizing with the operational processor nodes once the offline processor node becomes online again. In this manner, the offline processor node can synchronize to the latest (that is, newest) system configuration once it is online again.

In the illustrated embodiment, a processor node may have multiple I/O adapters including host and device adapters which are accessed through a switch such as a PCIe switch, for example. To increase efficiency, it is often desirable to share I/O adapters amongst the servers of the cluster. Thus, a device adapter, for example, may be shared as a "virtual" device adapter. The processor nodes typically communicate with the device adapters and other I/O adapters over a "fabric" which may comprise one or more interfaces providing communication paths between the nodes and adapters.

Communication paths 248 interconnect the various processor nodes 220 of the distributed computing system 200. The communication paths 248 may be part of an Ethernet network, for example, such that each processor node 220 has an individual network (internet protocol) address. Other types of networks or other communication paths may be utilized, such as a modem telephone path, wireless network, etc. depending upon the particular application.

The processor nodes of the system store data on one or more virtual volumes of a storage fabric represented by one or more disk storage devices 260. The storage fabric includes suitable communication paths 270 between the storage devices 260 of the storage fabric and the servers 210, 212. The storage fabric may include suitable switches and other fabric devices.

The hosts 250 are coupled to the distributed computing system 200 by communication paths 276 of a network fabric. The network fabric may similarly include suitable switches and other fabric communication devices.

In the illustrated embodiment, the servers 210, 212 provide an interface between the communication paths 276 coupled to the hosts 250, and communication paths 270 between the storage devices 260 of the storage fabric and the servers 210, 212. Thus, the communication paths 276 to the hosts 250 may be based upon a particular host attachment protocol such as Fibre Connection (FICON), for example, and the communication paths 270 may be based upon the Fibre Channel protocol, for example. It is appreciated that other communication path protocols may be utilized, depending upon the particular application.

The distributed computing system 200 performs data processing functions at each of the plurality of processor nodes 220a, 220b, 222a, 222b. In the illustrated embodiment, the data processing functions include storing data in and retrieving data from the storage 260. In accordance with one aspect of the present description, each processor node maintains a local synchronization data structure having an entry for each processor node in the distributed computing system.

Thus, as shown in FIG. 2, for example, a first processor node 220a of the plurality of processor nodes, has a first synchronization data structure in the form of a to-do tasks synchronization local table 280a. The table 280a has an entry for each processor node in the distributed computing system, as represented by the entry 282a for the first processor node 220a and the entry 282b for a second processor node 222a, for example. Each entry 282a, 282b for an associated processor node is configured to identify a processor node task to be completed by the associated processor node. In this example, each entry 282a, 282b for the processor nodes 220a, 222a, respectively, is configured to identify a reconfiguration related task to be performed by the associated processor node in association with a reconfiguration of the distributed computing system 200 in the event of a communication failure with the associated processor node in the distributed computing system.

Similarly, a second processor node 222a of the plurality of processor nodes, has a second synchronization data structure in the form of a to-do tasks synchronization local table 284a. The table 284a has an entry for each processor node in the distributed computing system, as represented by the entry 286a for the first processor node 220a and the entry 286b for a second processor node 222a, for example. Each entry 286a, 286b for an associated processor node is configured to identify a processor node task to be completed by the associated processor node. In this example, each entry 286a, 286b for the processor nodes 220a, 222a, respectively, is configured to identify a reconfiguration related task to be performed by the associated processor node in association with a reconfiguration of the distributed computing system 200 in the event of a communication failure with the associated processor node in the distributed computing system. Although the example of FIG. 2 depicts two processor nodes and two associated synchronization tables, it is appreciated that a system may have many processor nodes, each processor node having an associated synchronization table residing locally on that processor node.

In one scenario, a reconfiguration of the system 200 may be undertaken by one of the processor nodes, such as the first processor node 220a, for example. In this example, the first and second processor nodes 220a, 222a are both fully active and in full communication with each other. Accordingly, the second processor node 222a is fully aware of the reconfiguration operation being undertaken by the first processor node 220a. Hence, the second processor node 222a, like the first processor node which is performing the reconfiguration, will proceed to undertake the appropriate housekeeping tasks associated with the reconfiguration being performed by the first processor node 220a. Accordingly, the first processor node need not place a to-do task in the entry 282b for the second processor node 222a in the to-do tasks synchronization local table 280a of the first processor node 220a. Thus, the entry 282b for the second processor node 222a in the to-do tasks synchronization local table 280a of the first processor node 220a indicates "none" as depicted in the example of FIG. 2.

In another scenario, a reconfiguration of the system 200 may again be undertaken by one of the processor nodes, such as the first processor node 220a, for example. However, in this example, the first processor node 220a detects a failure to communicate with the second processor node 222a of the distributed computing system. As a result, the second processor node 222a is either inactive or not in full communication with the first processor node 220a as represented by the "X" placed over the diagram representing the second processor node 222a in FIG. 3. Accordingly, in this example, the second processor node 222a is not aware of the reconfiguration operation being undertaken by the first processor node 220a. Hence, the second processor node 222a, unlike the first processor node 220a which is performing the reconfiguration, will not immediately undertake the appropriate housekeeping tasks associated with the reconfiguration being performed by the first processor node 220a. Accordingly, in accordance with the present description, the first processor node 220a updates its local table 280a by placing a to-do task (designated Task1 in FIG. 3 as it is associated with a first reconfiguration operation) in the entry 282b for the second processor node 222a in the to-do tasks synchronization local table 280a of the first processor node 220a of FIG. 3. Thus, the entry 282b for the second processor node 222a in the to-do tasks synchronization local table 280a of the first processor node 220a indicates that processor node 222a is to perform the housekeeping "Task1" as depicted in the example of FIG. 3.

Figure 3:
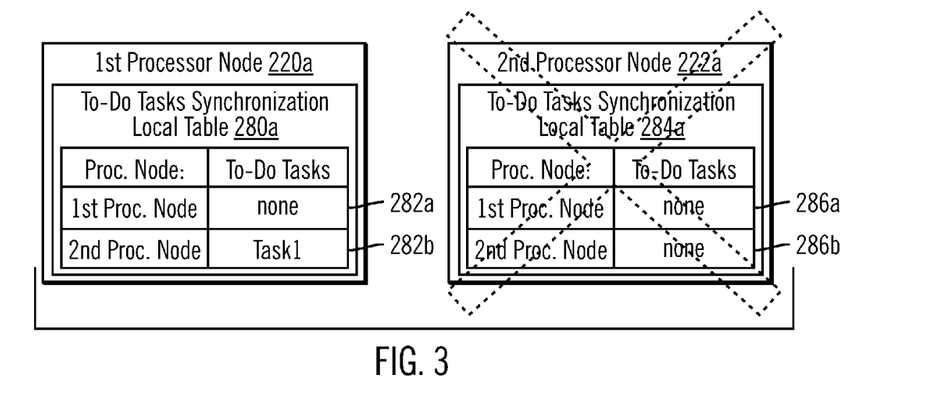
Figure 4:
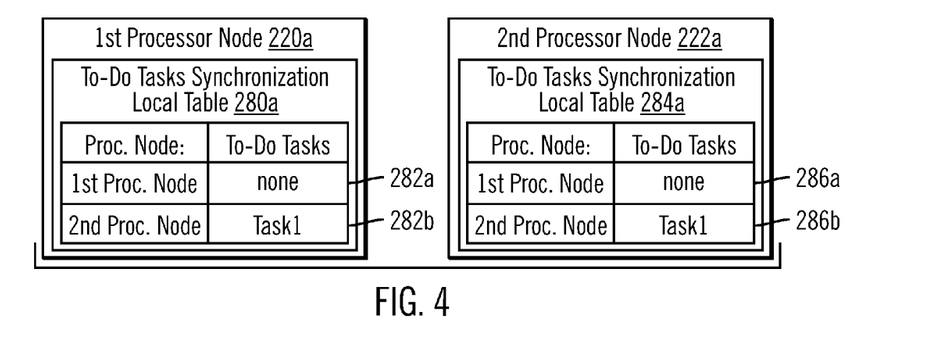

In another scenario following the scenario depicted in FIG. 3, the second processor node 222a returns to active status (or its communication links are restored, for example) and the first and second processor nodes reestablish communication with each other. The active or full communication status of the second processor node 222a is represented in FIG. 4 by the removal of the "X" over the depiction of the second processor node 222a. In another aspect of the present description, the second processor node upon becoming active or in full communication again, synchronizes its second synchronization data structure which in this example, is the to-do task synchronization local table 284a of the second processor node 222a, to the first synchronization data structure, that is the to-do tasks synchronization local table 280a of the first processor node 220a.

In this example, the synchronizing includes updating the entry associated with the second processor node in the second synchronization data structure to indicate the first reconfiguration task to be performed by the second processor node in association with the first reconfiguration. Thus, in this example, the second processor node 222a updates its local table 284a by placing a to-do task (designated Task1 in FIG. 4 as it is associated with the first reconfiguration operation) in the entry 286b for the second processor node 222a in the to-do tasks synchronization local table 284a of the second processor node 222a of FIG. 4. Thus, the entry 286b for the second processor node 222a in the to-do tasks synchronization local table 284a of the second processor node 222a matches the corresponding entry 282b of the to-do tasks synchronization local table 280a of the first processor node 220a, and indicates that the second processor node 222a is to perform the housekeeping "Task1" as depicted in the example of FIG. 4.

In another scenario following the scenario depicted in FIG. 4, the second processor node 222a performs the first reconfiguration related task (Task1) in association with the first reconfiguration of the distributed computing system by the first processor node 220a. In addition, the second processor node 222a updates the entry 286b associated with the second processor node in the second synchronization data structure in response to completion of the first reconfiguration related task by the second processor node 222a. Accordingly, the entry 286b for the second processor node 222a in the to-do tasks synchronization local table 284a of the second processor node 222a is updated by removing the designation "Task1" to indicate "none" as previously shown in FIG. 2, following the completion of Task1.

In another aspect of the present description, the first processor node 220a reestablishes communication with the second processor node 222a when the second processor node becomes active or in full communication again. In addition, the first processor node 220a synchronizes its first synchronization data structure which in this example, is the to-do task synchronization local table 280a of the first processor node 220a, to the second synchronization data structure, that is the to-do tasks synchronization local table 284a of the second processor node 222a.

In addition, the first processor node 222a updates the entry 282b associated with the second processor node in the first synchronization data structure in response to completion of the first reconfiguration related task (Task1) by the second processor node 222a. Accordingly, the entry 282b for the second processor node 222a in the to-do tasks synchronization local table 280a of the first processor node 220a is updated by removing the designation "Task1" to indicate "none" as previously shown in FIG. 2, following the completion of Task1.

In another scenario which follows the scenario depicted in FIG. 3, the second processor node 222a upon returning to active status, performs a second reconfiguration of the distributed computing system. Accordingly, the second processor node 222a also performs a second reconfiguration related task (designated Task2) associated with the second reconfiguration of the distributed computing system. In this scenario, the second processor node 222a detects a failure to communicate with the first processor node 220a of the distributed computing system.

Figure 5:
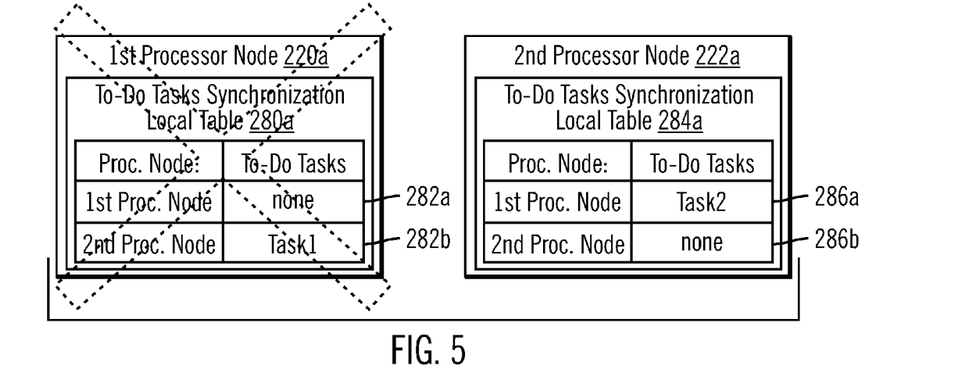

As a result, the first processor node 220a is either inactive or not in full communication with the second processor node 222a as represented by the "X" placed over the diagram representing the first processor node 220a in FIG. 5. Accordingly, in this example, the first processor node 220a is not aware of the second reconfiguration operation being undertaken by the second processor node 222a. Hence, the first processor node 220a, unlike the second processor node 222a which is performing the second reconfiguration, will not immediately undertake the appropriate housekeeping tasks associated with the second reconfiguration being performed by the second processor node 222a.

Accordingly, the second processor node 222a updates the entry 286a associated with the first processor node 220a in the second synchronization data structure (e.g. to-do tasks synchronization local table 284a) to indicate a second reconfiguration related task (Task2) to be performed by the first processor node in association with the second reconfiguration.

Figure 6:
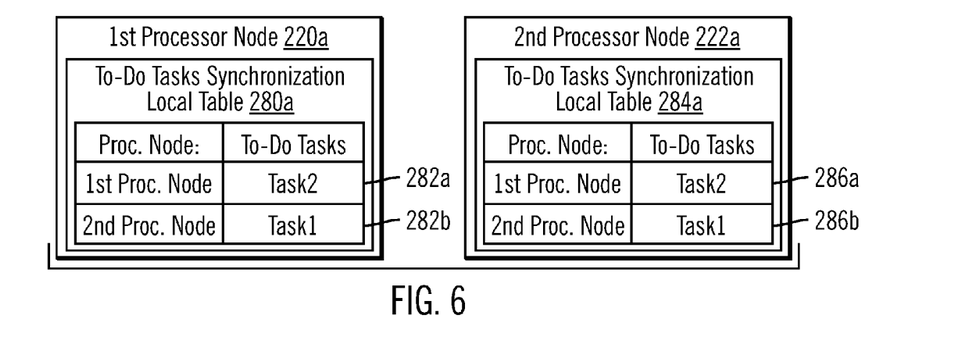

In another scenario following the scenario depicted in FIG. 5, the first processor node 220a returns to active status (or its communication links are restored, for example) and the first and second processor nodes reestablish communication with each other. The active or full communication status of the first processor node 220a is represented in FIG. 6 by the removal of the "X" over the depiction of the first processor node 220a. In another aspect of the present description, the first processor node 220a upon becoming active or in full communication again, synchronizes its first synchronization data structure which in this example, is the to-do task synchronization local table 280a of the first processor node 220a, to the second synchronization data structure, that is the to-do tasks synchronization local table 284a of the second processor node 222a.

In this example, the synchronizing includes updating the entry associated with the first processor node in the first synchronization data structure to indicate the second reconfiguration task to be performed by the first processor node in association with the second reconfiguration. Thus, in this example, the first processor node 220a updates its local table 280a by placing a to-do task (designated Task2 in FIG. 6 as it is associated with the second reconfiguration operation) in the entry 282a for the first processor node 220a in the to-do tasks synchronization local table 280a of the first processor node 220a of FIG. 6. Thus, the entry 282a for the first processor node 220a in the to-do tasks synchronization local table 280a of the first processor node 220a matches the corresponding entry 286a of the to-do tasks synchronization local table 284a of the second processor node 222a, and indicates that the first processor node 220a is to perform the housekeeping "Task2" as depicted in the example of FIG. 6.

In another aspect of the present description, the second processor node 222a upon the first processor node 220a becoming active or in full communication again, synchronizes its second synchronization data structure which in this example, is the to-do task synchronization local table 284a of the second processor node 222a, to the first synchronization data structure, that is the to-do tasks synchronization local table 280a of the first processor node 220a. In this example, the synchronizing includes updating the entry associated with the second processor node in the second synchronization data structure to indicate the first reconfiguration task to be performed by the second processor node in association with the first reconfiguration. Thus, in this example, the second processor node 222a updates its local table 284a by placing a to-do task (designated Task1 in FIG. 6 as it is associated with the first reconfiguration operation) in the entry 286b for the second processor node 222a in the to-do tasks synchronization local table 284a of the second processor node 222a of FIG. 4. Thus, the entry 286b for the second processor node 222a in the to-do tasks synchronization local table 284a of the second processor node 222a matches the corresponding entry 282b of the to-do tasks synchronization local table 280a of the first processor node 220a, and indicates that the second processor node 222a is to perform the housekeeping "Task1" as depicted in the example of FIG. 6.

Figure 7:
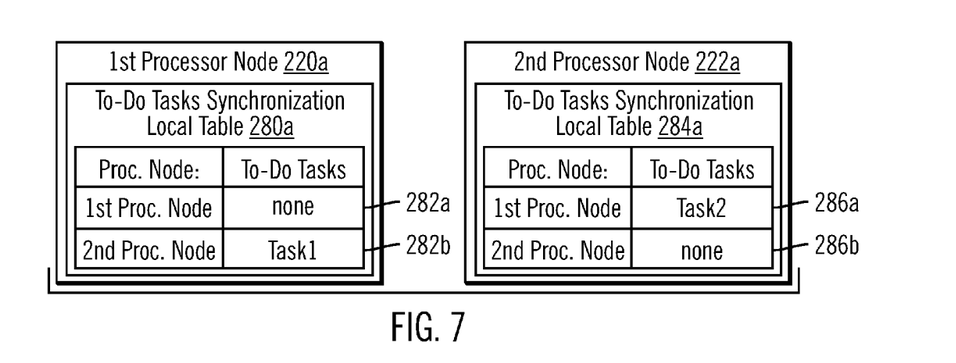

In another scenario following the scenario depicted in FIG. 6, the second processor node 222a performs the first reconfiguration related task (Task1) in association with the first reconfiguration of the distributed computing system by the first processor node 220a. In addition, the second processor node 222a updates the entry 286b associated with the second processor node in the second synchronization data structure in response to completion of the first reconfiguration related task by the second processor node 222a. Accordingly, the entry 286b for the second processor node 222a in the to-do tasks synchronization local table 284a of the second processor node 222a is updated by removing the designation "Task1" to indicate "none" as shown in FIG. 7, following the completion of Task1.

In another scenario following the scenario depicted in FIG. 6, the first processor node 220a performs the second reconfiguration related task (Task2) in association with the second reconfiguration of the distributed computing system by the second processor node 222a. In addition, the first processor node 220a updates the entry 282a associated with the first processor node in the first synchronization data structure in response to completion of the second reconfiguration related task by the first processor node 220a. Accordingly, the entry 282a for the first processor node 220a in the to-do tasks synchronization local table 280a of the first processor node 220a is updated by removing the designation "Task2" to indicate "none" as shown in FIG. 7, following the completion of Task2.

In addition, the first processor node 220a updates the entry 282b associated with the second processor node in the first synchronization data structure in response to completion of the first reconfiguration related task (Task1) by the second processor node 222a. Accordingly, the entry 282b for the second processor node 222a in the to-do tasks synchronization local table 280a of the first processor node 220a is updated by removing the designation "Task1" to indicate "none" as previously shown in FIG. 2, following the completion of Task1.

In addition, the second processor node 222a updates the entry 286a associated with the first processor node in the second synchronization data structure in response to completion of the second reconfiguration related task (Task2) by the first processor node 220a. Accordingly, the entry 286a for the first processor node 220a in the to-do tasks synchronization local table 284a of the second processor node 222a is updated by removing the designation "Task2" to indicate "none" as previously shown in FIG. 2, following the completion of Task2.

Figure 8:
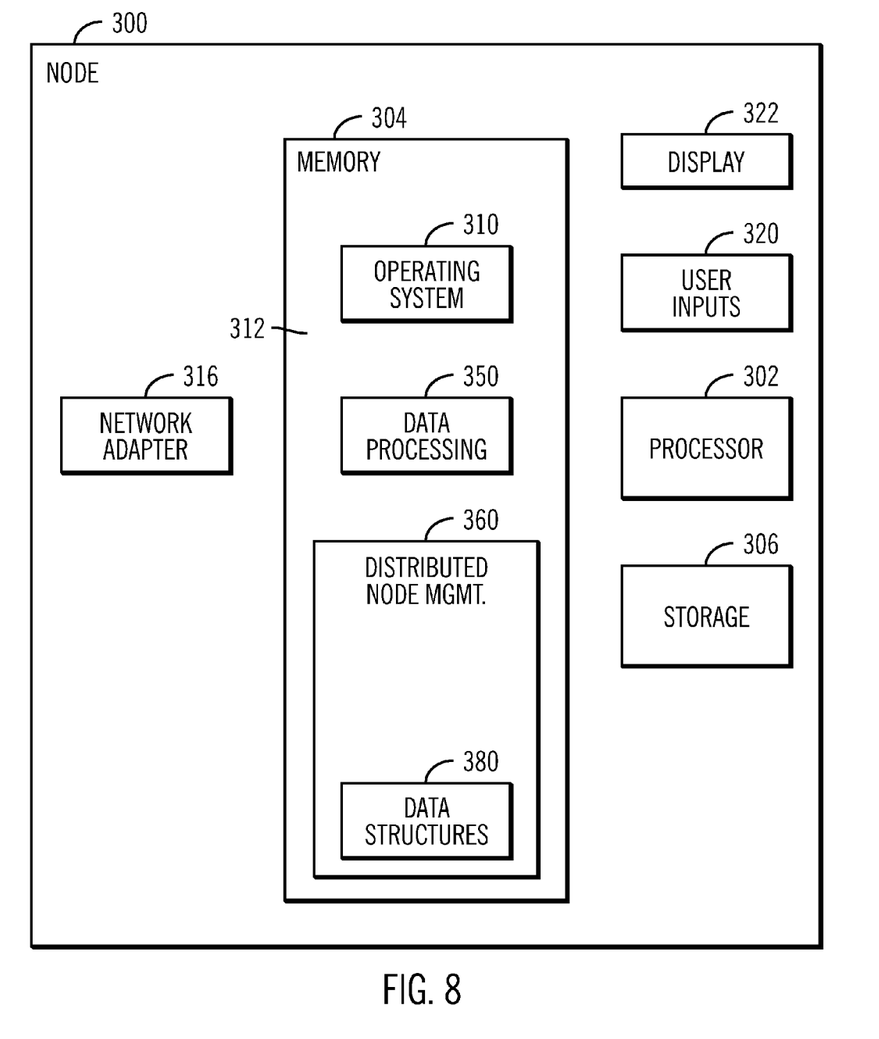
FIG. 8 illustrates an example of a processor node of the distributed computing system of FIG. 1 for use in connection with distributed node management in accordance with the present description.

FIG. 8 illustrates one embodiment of a processor node 300 which is representative of the processor nodes 220a, 220b, 222a, 222b, for example, of the distributed computing system 200. The processor node 300 of this example, may comprise any suitable computing device, such as a mainframe, server, personal computer, laptop, handheld computer, telephony device, network appliance, virtualization device, storage controller, etc. The processor node 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 as represented by an operating system 310 and programs 312. The processor node 300 further includes a network controller or adapter 316 to enable communication with a network such as the network 248 (FIG. 2), such as an Ethernet, a Fibre Channel Arbitrated Loop, etc. which interconnects the processor nodes of the distributed computing system 200. The network controller or adapter 316 may also enable communication with a network path 276 to a host 250 or with a network path 270 to storage 260.

User input devices 320 provide user input to the processor 302, and may include a keyboard, mouse, pen-stylus, microphone, touch sensitive display screen, or any other suitable activation or input mechanism. Output devices 322 are capable of rendering information transmitted from the processor 302, or other component, such as a display monitor, printer, storage, etc.

In one embodiment, the processor nodes 220 of each of the servers 210, 212 of the distributed computing system 200 perform a primary data processing function such as the functions storing data in and retrieving data from the storage

306. Thus, included in the memory 304 is suitable data processing programming 350 for performing the data processing functions such data storage and retrieval, for example, in disk arrays, for example. Thus, the processor nodes 220 may perform data processing tasks such as data backup, data deduplication, data mining, data capture, data archiving data replication, bandwidth reduced data replication, encryption of data, etc., and typically involve the transfer of large amounts of data between the hosts 250 (FIG. 1) and storage 260.

In accordance with the present description, each processor node 220, 300 further has distributed node management programming 360 which may share some or all of the hardware of each such processor node 220, 300 in running the distributed node management programming 360, including reconfiguring the distributed computing system and synchronizing data structures 380 such as a "to-do tasks" synchronization table that resides on each such processor node. As previously described, the "to-do-tasks" synchronization table (FIGS. 2-7) contains one or more actions that each processor node may perform to facilitate maintaining the operations of the associated processor node with equivalent knowledge of the system configuration, status and backup capabilities as the other processor nodes of the distributed computing system. Other features and aspects may be realized, depending upon the particular application. Thus, each processor node 300, 220 may perform other distributed node management functions within the distributed node management system.

Figure 9:
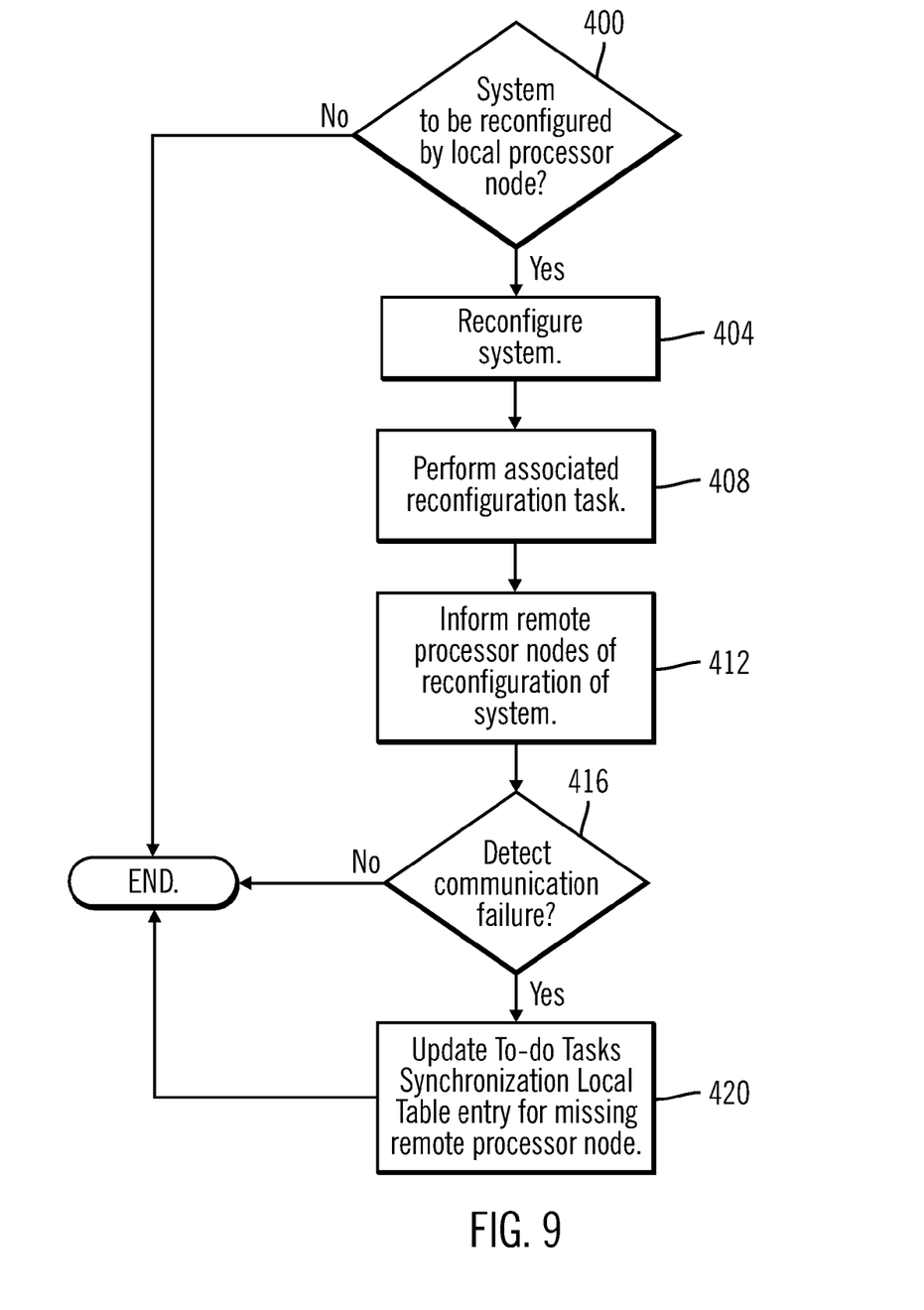
FIG. 9 depicts an example of operations of a local processor node for distributed node management in accordance with one aspect of the present description.

FIG. 9 depicts one example of operations of a local processor node such as a node 220a, 220b, 222a, 222b, 300 for distributed node management in accordance with one aspect of the present description. If (block 400) a local node such as the processor node 220a is to perform a reconfiguration of a distributed computing system, the system is reconfigured (block 404) by that node and the associated housekeeping or other tasks associated with the reconfiguration process are performed (block 408). If nodes remote to the local node are also active and communication has been established, the local node informs (block 412) the remote nodes of the reconfiguration so that the remote nodes can similarly perform the associated housekeeping tasks at their respective nodes. The operations of blocks 404-412 are similar to that of the scenarios discussed above in connection with FIG. 2.

If the local node detects (block 416) a communication failure indicating that a remote processor node has gone offline (inactive) or a communication link has gone down, the local node updates (block 420) its to-do tasks synchronization local table in a manner similar to that discussed above in connection with FIG. 3, to indicate the task or tasks which the missing processor node is to perform as a consequence of the reconfiguration performed by the local processor node.

Figure 10:
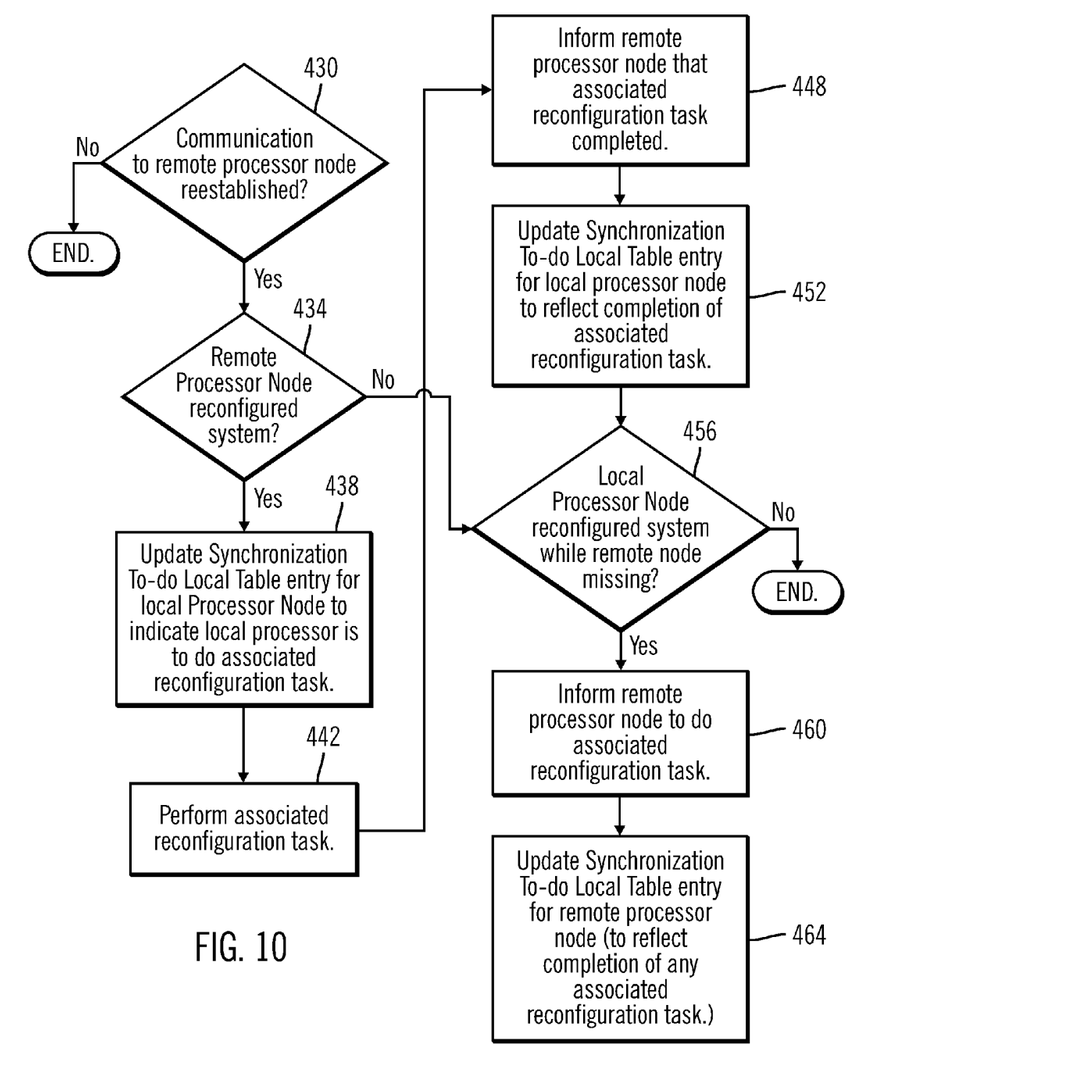
FIG. 10 depicts another example of operations of a local processor node for distributed node management in accordance with another aspect of the present description.

FIG. 10 depicts one example of operations of a local processor node such as a node 220a, 220b, 222a, 222b, 300 for distributed computing system management in accordance with the present description, in which a processor node comes back online or communication links are restored. Thus, if a local processor node detects (block 430) that communication to a remote processor node has been reestablished, the local processor node and the remote processor node can synchronize their respective to-do tasks synchronization local tables as discussed below.

In doing so, a determination may be made as to whether (block 434) the remote processor node has informed the local processor node that the remote processor node reconfigured the distributed computing system while the local node was inactive or missing. If so, the local processor node updates (block 438) its to-do tasks synchronization local table to indicate that the local processor node is to perform the reconfiguration task associated with the reconfiguration performed by the remote processor node. In addition, the local processor node performs (block 442) the reconfiguration task associated with the reconfiguration performed by the remote processor node. This is similar to the scenario discussed above in connection with FIG. 4 where the second processor node 222a discovered that the first processor node 220a performed a system reconfiguration while the second processor node 222a was inactive (FIG. 3). This is also similar to the scenario discussed above in connection with FIG. 6 where the first processor node 220a discovered that the second processor node 222a performed a system reconfiguration while the first processor node 220a was inactive (FIG. 5).

In addition, the local node informs (block 448) the remote processor node that the local processor node has performed the housekeeping task associated with the reconfiguration performed by the remote processor node, and updates (block 452) its to-do tasks synchronization local table in to indicate that the associated housekeeping task has been performed by the local processor node in a manner similar to that discussed above in connection with FIG. 2.

A determination (block 456) is made as to whether the local node has performed a reconfiguration (Block 404, FIG. 9) of the distributed computing system while the remote node was inactive or missing (block 416, FIG. 9). This may be done by inspecting the local node's to-do tasks synchronization local table entry for the remote processor node. As previously mentioned, if the local node had performed a reconfiguration (block 404, FIG. 9) of the distributed computing system while the remote node was inactive or missing (block 416, FIG. 9), the local processor node would have updated its to-do tasks synchronization local table entry for the missing remote processor node (block 420, FIG. 9) to indicate that the missing remote processor node is to perform the housekeeping task associated with the reconfiguration performed by the local node once communications with the missing remote processor node is restored.

Accordingly, if it is determined (block 456) as indicated by its to-do tasks synchronization local table entry for the remote processor node the that the remote processor node is to perform the housekeeping task associated with the reconfiguration performed by the local node, the remote processor node is informed (block 460) to perform the housekeeping task associated with the reconfiguration performed by the local node. Once informed by the remote processor node that the remote node has performed the housekeeping task associated with the reconfiguration performed by the local node, the local processor node updates (block 464) its to-do tasks synchronization local table to indicate that the housekeeping task associated with the reconfiguration performed by the local processor node has been performed by the remote processor node in a manner similar to that discussed above in connection with FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

performing data processing functions at each of a plurality of processor nodes in a distributed computing system having the plurality of processor nodes and storage coupled to said plurality of processor nodes, said data processing functions including storing data in and retrieving data from said storage, and monitoring other processor nodes in the distributed computing system; and a first processor node of said plurality of processor nodes:

maintaining a first synchronization data structure having an entry for each processor node in the distributed computing system, each entry for an associated processor node configured to identify a related task to be performed by the associated processor node in association with a multi-node correlated operation of the distributed computing system in an event of a communication failure with the associated processor node in the distributed computing system;

performing a first multi-node correlated operation of the distributed computing system;

detecting a failure to communicate with a second processor node of the distributed computing system;

performing a first multi-node correlated operation related task in association with said first multi-node correlated operation of the distributed computing system; and updating the entry associated with the second processor node in the first synchronization data structure to indicate a first multi-node correlated operation related task to be performed by the second processor node.

2. The method of claim 1 wherein the first multi-node correlated operation is a first reconfiguration of the distributed computing system and the first multi-node correlated operation related task is a first reconfiguration related task.

3. The method of claim 2 further comprising:

the second processor node of said plurality of processor nodes:

maintaining a second synchronization data structure having an entry for each processor node in the distributed computing system, each entry for an associated processor node configured to identify a reconfiguration related task to be performed by the associated processor node in association with a reconfiguration of the distributed computing system in the event of a communication failure with the associated processor node in the distributed computing system.

4. The method of claim 3 further comprising:

the second processor node of said plurality of processor nodes:

reestablishing communication with the first processor node; and synchronizing the second synchronization data structure to the first synchronization data structure, including updating the entry associated with the second processor node in the second synchronization data structure to indicate the first reconfiguration task to be performed by the second processor node in association with said first reconfiguration.

5. The method of claim 4 further comprising:

the second processor node of said plurality of processor nodes:

performing the first reconfiguration related task associated with said first reconfiguration of the distributed computing system; and updating the entry associated with the second processor node in the second synchronization data structure in response to completion of the first reconfiguration related task by the second processor node.

6. The method of claim 5 further comprising:

the first processor node of said plurality of processor nodes:

reestablishing communication with the second processor node; and synchronizing the first synchronization data structure to the second synchronization data structure, including updating the entry associated with the second processor node in the first synchronization data structure in response to completion of the first reconfiguration related task by the second processor node.

7. The method of claim 3 further comprising:

the second processor node of said plurality of processor nodes:

performing a second reconfiguration of the distributed computing system;

detecting a failure to communicate with the first processor node of the distributed computing system;

performing a second reconfiguration related task associated with said second reconfiguration of the distributed computing system; and updating the entry associated with the first processor node in the second synchronization data structure to indicate a second reconfiguration related task to be performed by the first processor node in association with said second reconfiguration.

8. The method of claim 7 further comprising:

the first processor node of said plurality of processor nodes:

reestablishing communication with the second processor node;

synchronizing the first synchronization data structure to the second synchronization data structure, including updating the entry associated with the first processor node in the first synchronization data structure to indicate the second reconfiguration related task to be performed by the first processor node;

performing the second reconfiguration related task in association with said second reconfiguration of the distributed computing system; and updating the entry associated with the first processor node in the first synchronization data structure in response to completion of the second reconfiguration related task by the first processor node.

9. The method of claim 8 further comprising:

the second processor node of said plurality of processor nodes:

reestablishing communication with the first processor node;

synchronizing the second synchronization data structure to the first synchronization data structure, including updating the entry associated with the second processor node in the second synchronization data structure to indicate the first reconfiguration related task to be performed by the second processor node in association with said first reconfiguration of the distributed computing system;

performing the first reconfiguration related task associated with said first reconfiguration of the distributed computing system; and updating the entry associated with the second processor node in the second synchronization data structure in response to completion of the first reconfiguration related task by the second processor node.

10. The method of claim 9 further comprising:
the first processor node of said plurality of processor nodes:
synchronizing the first synchronization data structure to the second synchronization data structure, including updating the entry associated with the second processor node in the first synchronization data structure in response to completion of the first reconfiguration related task by the second processor node; and
the second processor node of said plurality of processor nodes:
synchronizing the second synchronization data structure to the first synchronization data structure, including updating the entry associated with the first processor node in the second synchronization data structure in response to completion of the second reconfiguration related task by the first processor node.

11. A distributed computing system, comprising:
storage adapted to store data;
a plurality of processor nodes including a first processor node and a second processor node, each processor node adapted to access and control the storage; and
at least one computer readable storage medium having computer readable program instructions embodied therewith, the program instructions executable by the distributed computing system to cause the distributed computing system to perform operations, the operations comprising:
performing data processing functions at each of a plurality of processor nodes in a distributed computing system having the plurality of processor nodes and storage coupled to said plurality of processor nodes, said data processing functions including storing data in and retrieving data from said storage, and monitoring other processor nodes in the distributed computing system; and
a first processor node of said plurality of processor nodes:
maintaining a first synchronization data structure having an entry for each processor node in the distributed computing system, each entry for an associated processor node configured to identify a related task to be performed by the associated processor node in association with a multi-node correlated operation of the distributed computing system in an event of a communication failure with the associated processor node in the distributed computing system;
performing a first multi-node correlated operation of the distributed computing system;
detecting a failure to communicate with the second processor node of the distributed computing system;
performing a first multi-node correlated operation related task in association with said first multi-node correlated operation of the distributed computing system; and
updating the entry associated with the second processor node in the first synchronization data structure to indicate a first multi-node correlated operation related task to be performed by the second processor node.

12. The system of claim 11 wherein the first multi-node correlated operation is a first reconfiguration of the distributed computing system and the first multi-node correlated operation related task is a first reconfiguration related task, and wherein the operations further comprise:
the second processor node of said plurality of processor nodes:
maintaining a second synchronization data structure having an entry for each processor node in the distributed computing system, each entry for an associated processor node configured to identify a reconfiguration related task to be performed by the associated processor node in association with a reconfiguration of the distributed computing system in the event of a communication failure with the associated processor node in the distributed computing system;
reestablishing communication with the first processor node;
synchronizing the second synchronization data structure to the first synchronization data structure, including updating the entry associated with the second processor node in the second synchronization data structure to indicate the first reconfiguration task to be performed by the second processor node in association with said first reconfiguration;
performing the first reconfiguration related task associated with said first reconfiguration of the distributed computing system; and
updating the entry associated with the second processor node in the second synchronization data structure in response to completion of the first reconfiguration related task by the second processor node.

13. The system of claim 12 wherein the operations further comprise:
the first processor node of said plurality of processor nodes:
reestablishing communication with the second processor node; and
synchronizing the first synchronization data structure to the second synchronization data structure, including updating the entry associated with the second processor node in the first synchronization data structure in response to completion of the first reconfiguration related task by the second processor node.

14. The system of claim 13 wherein the operations further comprise:
the second processor node of said plurality of processor nodes:
performing a second reconfiguration of the distributed computing system;
detecting a failure to communicate with the first processor node of the distributed computing system;
performing a second reconfiguration related task associated with said second reconfiguration of the distributed computing system; and
updating the entry associated with the first processor node in the second synchronization data structure to indicate a second reconfiguration related task to be performed by the first processor node in association with said second reconfiguration; and
the first processor node of said plurality of processor nodes:
reestablishing communication with the second processor node;
synchronizing the first synchronization data structure to the second synchronization data structure, including updating the entry associated with the first processor node in the first synchronization data structure to indicate the second reconfiguration related task to be performed by the first processor node;

performing the second reconfiguration related task in association with said second reconfiguration of the distributed computing system; and updating the entry associated with the first processor node in the first synchronization data structure in response to completion of the second reconfiguration related task by the first processor node.

15. The system of claim 14 wherein the operations further comprise:

the second processor node of said plurality of processor nodes:

reestablishing communication with the first processor node;

synchronizing the second synchronization data structure to the first synchronization data structure, including updating the entry associated with the second processor node in the second synchronization data structure to indicate the first reconfiguration related task to be performed by the second processor node in association with said first reconfiguration of the distributed computing system;

performing the first reconfiguration related task associated with said first reconfiguration of the distributed computing system; and updating the entry associated with the second processor node in the second synchronization data structure in response to completion of the first reconfiguration related task by the second processor node;

the first processor node of said plurality of processor nodes:

synchronizing the first synchronization data structure to the second synchronization data structure, including updating the entry associated with the second processor node in the first synchronization data structure in response to completion of the first reconfiguration related task by the second processor node; and the second processor node of said plurality of processor nodes:

synchronizing the second synchronization data structure to the first synchronization data structure, including updating the entry associated with the first processor node in the second synchronization data structure in response to completion of the second reconfiguration related task by the first processor node.

16. A computer program product for use with a distributed computing system having storage adapted to store data, and a plurality of processor nodes including a first processor node and a second processor node, each processor node adapted to access and control the storage, the computer program product comprising at least one computer readable storage medium having computer readable program instructions embodied therewith, the program instructions executable by the distributed computing system to cause the distributed computing system to perform operations, the operations comprising:

performing data processing functions at each of a plurality of processor nodes in a distributed computing system having the plurality of processor nodes and storage coupled to said plurality of processor nodes, said data processing functions including storing data in and retrieving data from said storage, and monitoring other processor nodes in the distributed computing system; and a first processor node of said plurality of processor nodes:

maintaining a first synchronization data structure having an entry for each processor node in the distributed computing system, each entry for an associated processor node configured to identify a related task to be performed by the associated processor node in association with a multi-node correlated operation of the distributed computing system in an event of a communication failure with the associated processor node in the distributed computing system;

performing a first multi-node correlated operation of the distributed computing system;

detecting a failure to communicate with the second processor node of the distributed computing system;

performing a first multi-node correlated operation related task in association with said first multi-node correlated operation of the distributed computing system; and updating the entry associated with the second processor node in the first synchronization data structure to indicate a first multi-node correlated operation related task to be performed by the second processor node.

17. The computer program product of claim 16 wherein the first multi-node correlated operation is a first reconfiguration of the distributed computing system and the first multi-node correlated operation related task is a first reconfiguration related task, and wherein the operations further comprise:

the second processor node of said plurality of processor nodes:

maintaining a second synchronization data structure having an entry for each processor node in the distributed computing system, each entry for an associated processor node configured to identify a reconfiguration related task to be performed by the associated processor node in association with a reconfiguration of the distributed computing system in the event of a communication failure with the associated processor node in the distributed computing system;

reestablishing communication with the first processor node;

synchronizing the second synchronization data structure to the first synchronization data structure, including updating the entry associated with the second processor node in the second synchronization data structure to indicate the first reconfiguration task to be performed by the second processor node in association with said first reconfiguration;

performing the first reconfiguration related task associated with said first reconfiguration of the distributed computing system; and updating the entry associated with the second processor node in the second synchronization data structure in response to completion of the first reconfiguration related task by the second processor node.

18. The computer program product of claim 17 wherein the operations further comprise:

the first processor node of said plurality of processor nodes:

reestablishing communication with the second processor node; and synchronizing the first synchronization data structure to the second synchronization data structure, including updating the entry associated with the second processor node in the first synchronization data structure in response to completion of the first reconfiguration related task by the second processor node.

19. The computer program product of claim 18 wherein the operations further comprise:
the second processor node of said plurality of processor nodes:
performing a second reconfiguration of the distributed computing system;
detecting a failure to communicate with the first processor node of the distributed computing system;
performing a second reconfiguration related task associated with said second reconfiguration of the distributed computing system; and
updating the entry associated with the first processor node in the second synchronization data structure to indicate a second reconfiguration related task to be performed by the first processor node in association with said second reconfiguration; and
the first processor node of said plurality of processor nodes:
reestablishing communication with the second processor node;
synchronizing the first synchronization data structure to the second synchronization data structure, including updating the entry associated with the first processor node in the first synchronization data structure to indicate the second reconfiguration related task to be performed by the first processor node;
performing the second reconfiguration related task in association with said second reconfiguration of the distributed computing system; and
updating the entry associated with the first processor node in the first synchronization data structure in response to completion of the second reconfiguration related task by the first processor node.

20. The computer program product of claim 19 wherein the operations further comprise:
the second processor node of said plurality of processor nodes:
reestablishing communication with the first processor node;
synchronizing the second synchronization data structure to the first synchronization data structure, including updating the entry associated with the second processor node in the second synchronization data structure to indicate the first reconfiguration related task to be performed by the second processor node in association with said first reconfiguration of the distributed computing system;
performing the first reconfiguration related task associated with said first reconfiguration of the distributed computing system; and
updating the entry associated with the second processor node in the second synchronization data structure in response to completion of the first reconfiguration related task by the second processor node;
the first processor node of said plurality of processor nodes:
synchronizing the first synchronization data structure to the second synchronization data structure, including updating the entry associated with the second processor node in the first synchronization data structure in response to completion of the first reconfiguration related task by the second processor node; and
the second processor node of said plurality of processor nodes:
synchronizing the second synchronization data structure to the first synchronization data structure, including updating the entry associated with the first processor node in the second synchronization data structure in response to completion of the second reconfiguration related task by the first processor node.

\* \* \* \* \*